United States Patent

[11] 3,561,770

| [72] | Inventors | George L. Corsi<br>Southfield;<br>Mario Zelaya, Royal Oak; Stanley N. Smith, Farmington, Mich. |
|---|---|---|
| [21] | Appl. No. | 765,315 |
| [22] | Filed | Oct. 7, 1968 |
| [45] | Patented | Feb. 9, 1971 |
| [73] | Assignee | Federal-Mogul Corporation<br>Southfield, Mich.<br>a corporation of Michigan |

[54] SHAFT SEAL
10 Claims, 5 Drawing Figs.

[52] U.S. Cl.................................................. 277/35,
 277/37, 277/39, 277/164, 277/134
[51] Int. Cl....................................................... F16j 15/32,
 F16j 15/02
[50] Field of Search........................................ 277/35, 37,
 39, 58, 153

[56] References Cited
UNITED STATES PATENTS

| 2,938,744 | 5/1960 | Fritch............................ | 277/39 |
| 3,021,161 | 2/1962 | Rhoades et al. .............. | 277/37 |
| 3,356,376 | 12/1967 | Bradfute et al. .............. | 277/37 |
| 3,363,911 | 1/1968 | McKinven, Jr. .............. | 277/153X |

*Primary Examiner*—Samuel O. Rothberg
*Attorney*—Owen, Wickersham & Erickson

ABSTRACT: A unitized seal for sealing between a stationary shaft and the bore of a rotating housing. The shaft-supported annular oil-sealing element has a metal reinforcing member with an inner cylindrical reinforcing portion and a radially outwardly extending radial flange; an elastomeric element molded and bonded to the reinforcing element has an inner peripheral portion for snug engagement of the stationary shaft, a dirt-excluding lip extending radially outwardly from the free edge of the cylindrical reinforcing portion, a radially outwardly extending portion on the axially outer surface of the radial flange and extending axially outwardly thereof, and a main oil-sealing element lying mostly radially outwardly beyond the radial flange and axially back in the direction of the cylindrical portion and having a lip body with a lip member on the radially inward side thereof. A wear sleeve member has an outermost cylindrical portion adapted to fit in and rotate with the bore; a radial portion leads radially inwardly to a cylindrical wear sleeve portion in engagement with the main oil sealing lip, and a recurved portion leads radially in from there to an innermost cylindrical portion in engagement with the dirt-excluding lip. A unitizing member has a cylindrical portion fitting held snugly inside the outermost cylindrical portion and a radial flange leading radially inwardly.

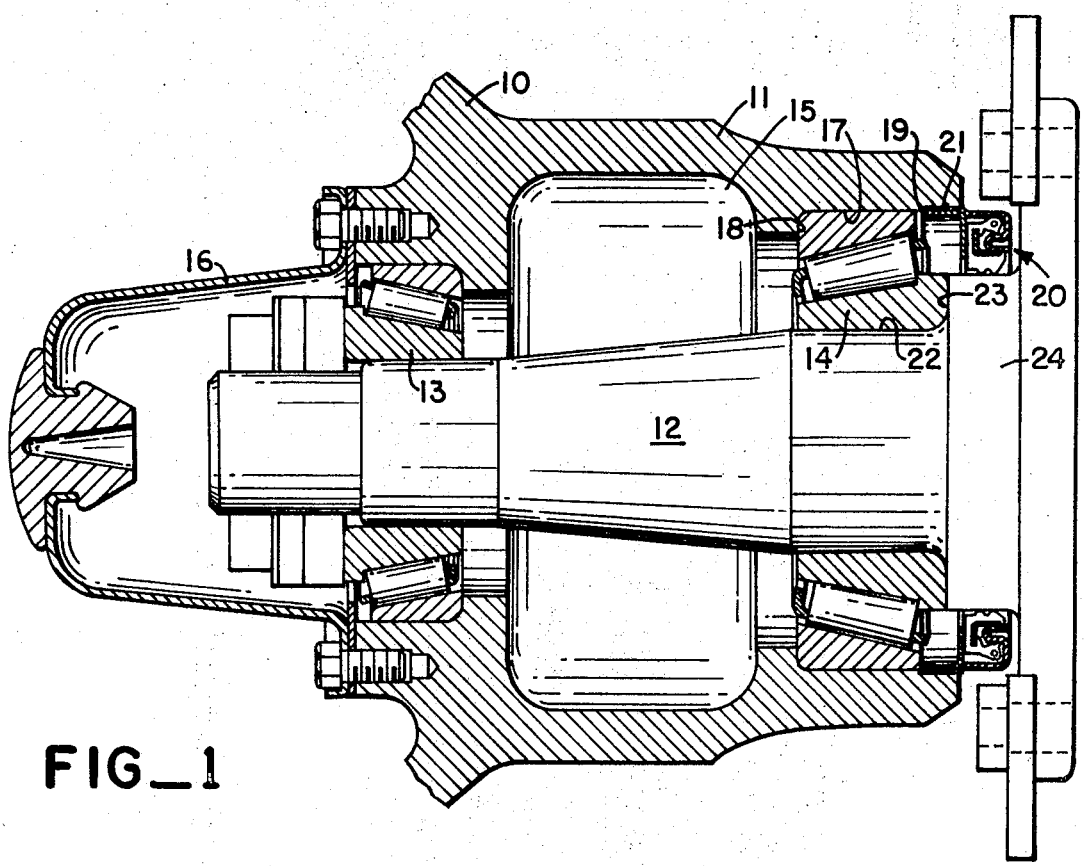
FIG_1
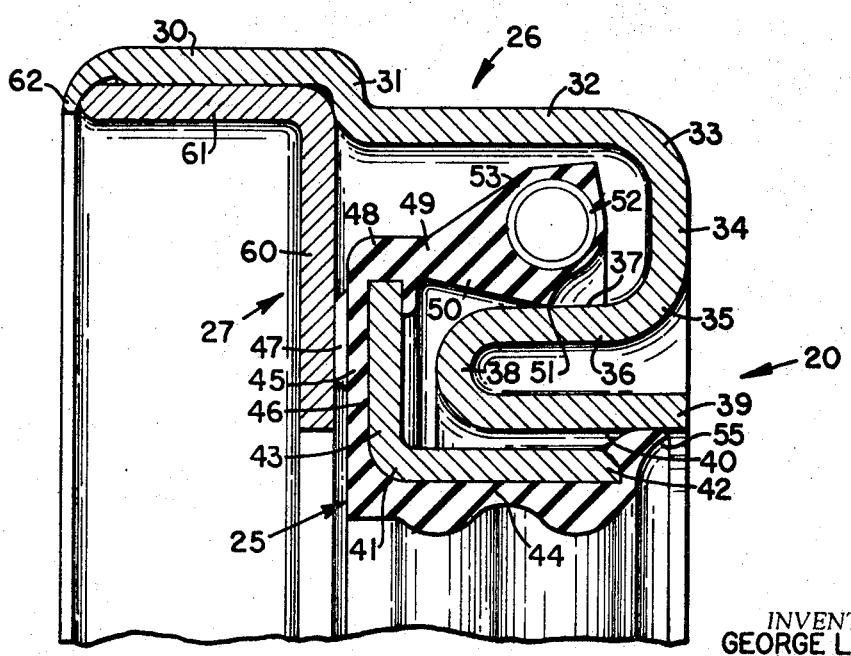
FIG_2
INVENTOR.
GEORGE L. CORSI
MARIO ZELAYA
BY STANLEY N. SMITH
Owen, Wickersham & Erickson
ATTORNEYS

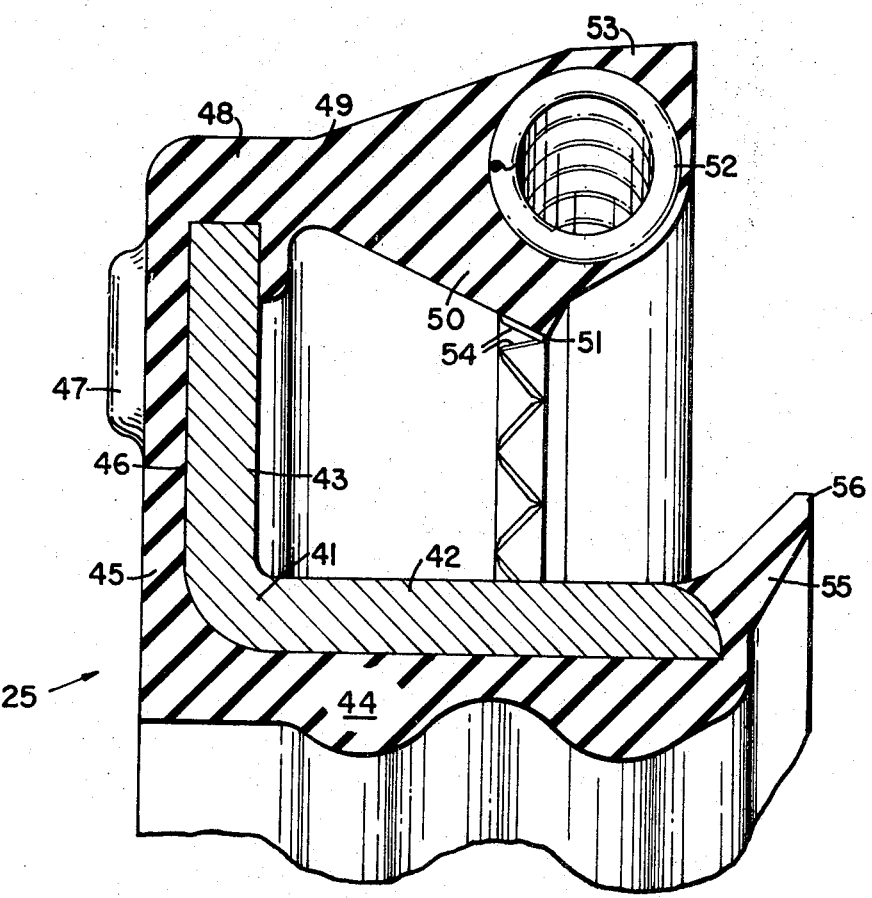
FIG_3
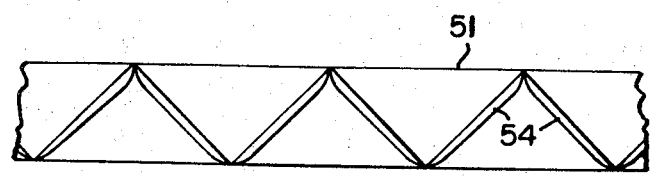
FIG_4

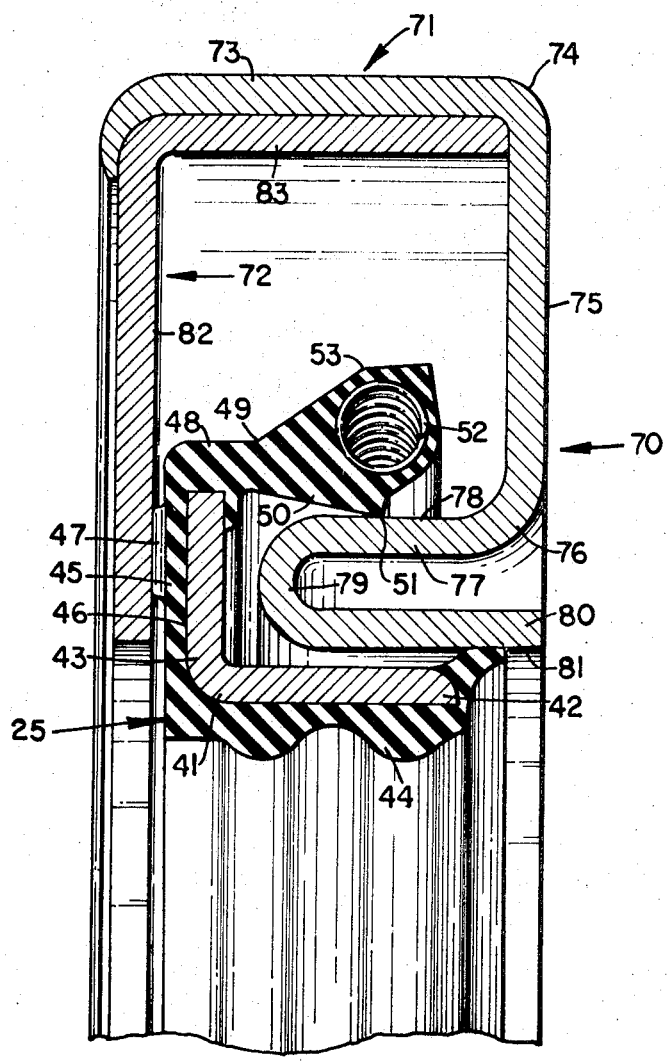
FIG_5

SHAFT SEAL

This invention relates to an improved radial shaft seal.

In typical installations, radial shaft seals are used between a rotating shaft and a stationary housing bore, and the short seal is held stationary in the bore while its lip wipes the rotating shaft. However, in some installations the shaft is stationary and the element providing the bore is the one that rotates. In this latter type of installation an ordinary radial shaft seal installed in the bore would be rotating instead of stationary, and its rotating lip would therefore cause a centrifugal force. Simply to reverse the arrangement and secure a seal to the shaft and have its lip engage the bore (a so-called exterior type of oil seal) makes an important difference in operation of the seal, which in many instances is undesirable since there is again a centrifugal force operating against the sealing action and because a seal of this type requires that the lip be exposed to a larger diameter running or wear surface, and thus to higher surface speeds and resultant shortened sealing element life.

The present invention enables the use of a stationary seal, mounted on the stationary shaft, with its metal case bonded to a cylindrical stationary seal at the inner periphery of the seal instead of to the outer periphery as in a typical shaft seal. Yet the direction of sealing remains the same as in a conventional seal. The seal is especially well suited to a unitized construction, in which the sealing lip runs on a wear sleeve with the sealing element and wear sleeve joined together as a unit for installation and removed as a unit.

Other advantages and objects of the invention will appear from the following description of some preferred embodiments.

In the drawings:

FIG. 1 is a fragmentary view in elevation and in section of a front axle automotive installation incorporating a seal embodying the principles of the present invention.

FIG. 2 is an enlarged view in elevation and in section of the unitized seal of FIG. 1.

FIG. 3 is a further enlarged view in elevation and in section of the seal element of the seal of FIG. 2.

FIG. 4 is a still further enlarged fragmentary view in elevation of the molded lip of the seal element of FIG. 3.

FIG. 5 is a view similar to FIG. 2 of a modified form of seal also embodying the principles of the invention.

FIG. 1 illustrates a typical installation where the invention is applicable. A heavy front axle 10 terminates in a hollow rotating member 11 providing a housing around a stationary shaft 12, with a pair of tapered roller bearings 13 and 14 in between the two and oil in the space 15 between the two bearings 13 and 14. A housing cover 16 is employed to close the end adjacent the bearing 13, being secured to and rotating with the housing 11. A unitized radial shaft seal 20 of this invention is located adjacent the other bearing 14 to prevent leakage of oil out from between the rotating housing 11 and the stationary shaft 12.

In the particular installation shown in FIG. 1, the bearing 14 is seated in a housing bore 17 against a step 18, and a second step 19 leads to a bore 21 for a unitized seal 20, which may also rest against the step 19. The shaft 12 has a portion 22 for receiving the bearing 14 against the step 23 and a cylindrical portion 24 which is engaged by the unitized seal 20.

As shown in FIG. 2 the unitized seal 20 may comprise three separate elements—an oil seal element 25, a wear sleeve 26, and a unitizing member 27. The rotating wear sleeve 26 is anchored by a press fit in the bore 21 of the housing 11, and the stationary oil sealing member 25 is snugly held by the axle 12. The unitizing member 27 is secured to and rotates with the wear sleeve 20.

The wear sleeve 26 comprises a continuous metal annulus, preferably with the configuration shown in FIG. 2. There is a cylindrical outermost seating portion 30 which snugly engages the bore 21 and prevents leakage of oil therebetween. A step 31 leads to a second cylindrical portion 32 which may extend outside the bore 21 and leads by a smooth radius 33 into a radial portion 34. From the radial portion 34 a smooth radius 35 leads to a cylindrical oil-seal-engaging portion 36 with a smooth wear sleeve surface 37. The portion 36 is followed by a recurved portion 38 leading to an innermost cylindrical portion 39 with a smooth wear sleeve surface 40.

The oil seal member 25 itself may comprise a metal or other stiffening or reinforcing member 41 with an inner cylindrical portion 42 and an outwardly extending radial flange 43. To this member 41 is bonded during molding an elastomer of suitable qualities, shaped to provide an inner anchor portion 44, (preferably embodying the invention shown in U.S. Pat. No. 3,356,376 which calls for a series of circumferential ridges and valleys) which engages and tightly hugs the shaft 12 so that there is no leakage between the element 25 and the shaft 12. A radially outwardly extending portion 45 is bonded along the outer face 46 of the radial flange 43 and is provided with a plurality of spacers or bumpers 47 spaced apart from each other.

An outer body portion 48 is connected by a flexing neck 49 to a main sealing lip portion 50, which may well be provided not only with a sealing lip 51 but also with a garter spring 52 preferably molded inside a lip body portion 53 adjacent the lip 51 and urging the sealing lip 51 into firm rotary sealing contact with the wear surface 37. The lip 51 may include bidirectional spiral-segment ridges 54.

A dirt-excluding lip 55 is preferably provided extending from the anchor portion 44 up to an edge 56 axially beyond the cylindrical metal portion 42 and in engagement with the wear surface 40.

The unitizing member 27 may be relatively simple, having a radial flange 60 succeeded by a cylindrical portion 61 which fits snugly inside the outer cylindrical portion 30 and up against the step 31, the radial flange 60 extending in far enough to limit movement of the oil seal member 25. After the oil seal member 25 has been assembled to the wear sleeve 26, the unitizing member 27 is put in place, and then a closure is effected, as by turning over the edge 62 of the portion 30 to lock the assembly in place.

The plurality of bumpers or spacers 47 then serve as guides to locate the seal 25, and at the start of operations typically engage, loosely, the radial flange 60. In operation, the surfaces of the bumpers 47 may wear off quickly and then not actually touch the flange 60 but they still limit any movement of the seal element 25 and complete the fully unitized seal 20.

Thus, in operation the seal element 25 remains stationary, since it is mounted on the stationary shaft 12, while the wear sleeve assembly 26, 27 rotates. The seal 25 has an oil-sealing contact with the wear sleeve 26 by the stationary lip 51 on the rotating cylindrical surface 37, while the dirt exclusion lip 55 is urged at light pressure against the rotating surface 40 of the wear sleeve 26 and excludes dirt from getting inside. The recurve 38 enables the lip 55 to be relatively short and therefore to be more efficient. The main sealing lip 51, though supported by a stationary shaft 12, still seals like a sealing lip which is held in a stationary bore against a rotating cylindrical shaft, in this case the shaft being replaced by the wear sleeve member 36 lying inside the lip 51.

When the bore and shaft surfaces are aligned, instead of being offset as in FIG. 1, a modified form of unit assembly 70 shown in FIG. 5 may be used. The oil seal element 25 may remain unchanged but here are differences elsewhere, in changed forms of a wear sleeve 71 and a unitizing member 72. The rotating wear sleeve 71 is again anchored by a press fit in the bore (not shown), and the stationary oil sealing member 25 is again snugly held by the axle (not shown), while the unitizing member 72 is again secured to and rotates with the wear sleeve 71.

The wear sleeve 71 comprises a continuous metal annulus, preferably with the configuration shown in FIG. 5. A cylindrical outermost seating portion 73 snugly engages the bore (not shown) and leads by a smooth radius 74 into a radial portion 75. From the radial portion 75 a smooth radius 76 leads to a cylindrical oil-seal-engaging portion 77 with a smooth wear sleeve surface 78. The portion 77 is followed by a recurved portion 79 leading to an innermost cylindrical portion 80 with a smooth wear sleeve surface 81.

The unitizing member 72 may be relatively simple, having a radial flange 82 succeeded by a cylindrical portion 83 which fits snugly inside the outer cylindrical portion 73 and up against the radial portion 75, the radial flange 82 extending in far enough to limit movement of the oil seal member 25. After the oil seal member 25 has been assembled to the wear sleeve 71, the unitizing member 72 is put in place, and then a closure is effected, as by turning over the edge 84 of the portion 73 to lock the assembly 70 together.

Once again, the plurality of bumpers or spacers 47 then serve as guides to locate the seal 25, and at the start of operations typically engage, loosely, the radial flange 82. After the surfaces of the bumpers 47 have worn off so that they do not actually touch the flange 82, they continue to limit any movement of the seal element 25 and complete the fully unitized seal 70.

In operation, the seal element 25 remains stationary, since it is mounted on a stationary shaft, while the wear sleeve assembly 71, 72 rotates. The seal 25 has oil-sealing contact with the wear sleeve 71 by the stationary lip 51 on the rotating cylindrical surface 78, while the dirt exclusion lip 55 is urged at light pressure against the rotating surface 81 of the wear sleeve 71 and excludes dirt from getting inside. The recurve 79 enables the lip 55 to be relatively short and therefore to be more efficient. The main sealing lip 51, though supported by a stationary shaft, still seals like a sealing lip which is held in a stationary bore against a rotating cylindrical shaft, in this case the shaft being replaced by the wear sleeve member 77 lying inside the lip 51.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A seal assembly including in combination:
   an annular oil-sealing element adapted to be mounted on a stationary shaft having;
   a metal reinforcing member with a radially inner reinforcing portion and a radially outwardly extending portion;
   an elastomeric element molded and bonded to said reinforcing element and having an inner peripheral portion for snug engagement of the shaft, a radially outwardly extending portion supported by said reinforcing member, and a main oil-sealing element extending axially from the outer extremity thereof and having a lip body with a lip member on its radially inward side; and
   a wear sleeve member having an outer cylindrical portion adapted to fit in a rotating bore and to rotate therewith, with a portion leading radially inwardly from said outer cylindrical portion to a cylindrical main wear sleeve portion lying radially inwardly of said lip body and having an outer surface in engagement with said lip member.

2. The seal assembly of claim 1 having unitizing means secured to said wear sleeve member and having a portion leading from said outer cylindrical portion radially inwardly to a position on the opposite side of said radially outwardly extending portions of said metal reinforcing member from said cylindrical wear sleeve portion.

3. A unitized seal assembly including in combination
   an annular oil-sealing element adapted to be mounted on a stationary shaft with;
   a metal reinforcing member having an inner cylindrical reinforcing portion and a radially outwardly extending radial flange;
   an elastomeric element molded and bonded to said reinforcing element and having an inner peripheral portion for snug engagement of the shaft, a radially outwardly extending portion on said radial flange having a plurality of bumper elements spaced therearound and extending axially outwardly thereof, and a main oil-sealing element lying mostly radially outwardly beyond said radial flange and extending axially back in the direction of said cylindrical portion and having a lip body with a lip member on the radially inward side of said body;
   a wear sleeve member having an outermost cylindrical portion adapted to fit in a rotating bore and to rotate therewith and a radial portion leading radially inwardly to a cylindrical wear sleeve portion having a radially outer surface in engagement with said main oil-sealing lip; and
   a unitizing member comprising a cylindrical portion fitting snugly inside and anchored to said outermost cylindrical portion and a radial flange leading from said outermost cylindrical portion radially inwardly into a radial position where it can engage said bumper portions.

4. The unitized seal assembly as defined in any one of claims 2 or 3 wherein in said wear sleeve member said radial portion is connected to said outermost cylindrical portion through an inner cylindrical portion that is joined by a step to said outer cylindrical portion, the cylindrical portion of said unitizing member being seated against said step.

5. The unitized seal assembly as defined in any one of claims 2 or 3 wherein in said wear sleeve said radial portion is connected directly to said outermost cylindrical portion and said cylindrical portion of said unitizing member is seated against said radial portion of said wear sleeve member.

6. The seal assembly as defined in any of claims 1, 2, or 3 wherein said wear sleeve member has an inner cylindrical wear sleeve portion lying radially inside said main wear sleeve portion and said elastomeric element has an auxiliary dirt-sealing lip extending out from said inner peripheral portion and engaging the radially inner surface of said inner wear sleeve portion.

7. The seal assembly as defined in any one of claims 1, 2, or 3 wherein said lip body has a molded-in spring urging said main oil-sealing lip against said cylindrical wear sleeve portion.

8. A unitized seal including in combination:
   an oil-sealing element adapted to be mounted on a stationary shaft and forming a continuous annulus with;
   a metal reinforcing member having an inner cylindrical reinforcing portion and a radially outwardly extending radial flange;
   an elastomeric element molded and bonded to said reinforcing element and having an inner peripheral portion for snug engagement of the shaft, a dirt-excluding lip extending radially outwardly from the free edge of said cylindrical reinforcing portion, a radially outwardly extending portion on the axially outer surface of said radial flange having a plurality of bumper elements spaced therearound and extending axially outwardly thereof, and a main oil-sealing element lying mostly radially outwardly beyond said radial flange and extending axially back in the direction of said cylindrical portion and having a lip body with a spring molded therein and a lip member on the radially inward side of said body;
   a wear sleeve member having an outermost cylindrical portion adapted to fit in a rotating bore and to rotate therewith, a radial portion leading radially inwardly to a cylindrical wear sleeve portion having a radially outer surface in engagement with said main oil-sealing lip, and a recurved portion leading radially in to an innermost cylindrical portion having a radially inner surface in engagement with said dirt-excluding lip;
   a unitizing member comprising a cylindrical portion fitting snugly inside said outermost cylindrical portion and a radial flange leading from said step radially inwardly into a radial position where it can engage said bumper portions; and
   said unitized seal being held together by closure over said unitizing portion of an outer free edge of the outermost cylindrical portion of said wear sleeve member.

9. The unitized seal of claim 8 wherein said radial portion of said wear sleeve member is joined to said outermost cylindrical portion through an inner cylindrical portion that is joined to said outermost cylindrical portion by a step, said unitizing member having its cylindrical portion and its radial portion meeting at a corner that abuts said step while said outer free edge closes over the free edge of its said cylindrical portion.

10. The unitized seal of claim 8 wherein said radial portion of said wear sleeve member is joined directly to said outermost cylindrical portion and the cylindrical portion of said unitizing member has a free edge abutting that said radial portion and meets said radial flange at a corner engaged by said closure over said outer free edge of said outermost cylindrical portion.